United States Patent
Whitmire et al.

(10) Patent No.: US 10,928,889 B1
(45) Date of Patent: Feb. 23, 2021

(54) APPARATUS, SYSTEM, AND METHOD FOR DIRECTIONAL ACOUSTIC SENSING VIA WEARABLES DONNED BY USERS OF ARTIFICIAL REALITY SYSTEMS

(71) Applicant: Facebook Technologies, LLC, Menlo Park, CA (US)

(72) Inventors: Eric Michael Whitmire, Seattle, WA (US); Wolf Kienzle, Seattle, WA (US); David R. Perek, Seattle, WA (US); Hrvoje Benko, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/254,370

(22) Filed: Jan. 22, 2019

(51) Int. Cl.
   *G06F 3/01* (2006.01)
   *G01S 15/04* (2006.01)

(52) U.S. Cl.
   CPC .............. *G06F 3/011* (2013.01); *G01S 15/04* (2013.01); *G06F 3/017* (2013.01)

(58) Field of Classification Search
   CPC ........... G06F 3/011; G06F 3/014; G01S 15/04
   See application file for complete search history.

(56) References Cited

U.S. PATENT DOCUMENTS

| | | | | |
|---|---|---|---|---|
| 2015/0234454 A1* | 8/2015 | Kurz | .................... | G06F 3/011 345/156 |
| 2016/0179199 A1* | 6/2016 | Levesque | ................ | G06F 3/011 340/407.2 |
| 2017/0038832 A1* | 2/2017 | Du | .......................... | G06F 1/163 |
| 2017/0123487 A1* | 5/2017 | Hazra | .................... | G06F 3/015 |
| 2019/0277966 A1* | 9/2019 | Schoessler | ........ | H04M 1/72569 |

FOREIGN PATENT DOCUMENTS

WO   WO-2015158188 A1 * 10/2015 ............. G06F 1/163

OTHER PUBLICATIONS

Gierad Laput, "SkinTrack", URL: http://www.gierad.com/projects/skintrack/, retrieved on May 19, 2020, pp. 1-7.

\* cited by examiner

*Primary Examiner* — Michael Pervan
(74) *Attorney, Agent, or Firm* — FisherBroyles, LLP

(57) ABSTRACT

An apparatus for directional acoustic sensing may include a wearable dimensioned to be donned by a user of an artificial reality system. The wearable may include a signal generator that propagates an acoustic wave via a body of the user toward a specific body part. The wearable may also include an acoustic sensor that detects an acoustic reflection of the acoustic wave propagated by the signal generator. The wearable may further include at least one processing device that is communicatively coupled to the acoustic sensor. The processing device may determine that the specific body part has made physical contact with an object based at least in part on the acoustic reflection. In response, the processing device may generate an input command for the artificial reality system that accounts for the specific body part making physical contact with the object. Various other apparatuses, systems, and methods are also disclosed.

19 Claims, 8 Drawing Sheets

APPARATUS, SYSTEM, AND METHOD FOR DIRECTIONAL ACOUSTIC SENSING VIA WEARABLES DONNED BY USERS OF ARTIFICIAL REALITY SYSTEMS

BACKGROUND

Artificial reality often provides a rich, immersive experience in which users are able to interact with virtual objects and/or environments in one way or another. In this context, artificial reality may constitute a form of reality that has been altered by virtual objects for presentation to a user. Such artificial reality may include and/or represent virtual reality (VR), augmented reality (AR), mixed reality (MR), hybrid reality, or some combination and/or variation one or more of the same. Although artificial reality systems are commonly implemented for gaming and other entertainment purposes, such systems are also implemented for purposes outside of recreation. For example, governments may use them for military training simulations, doctors may use them to practice surgery, engineers may use them as visualization aids, and co-workers may use them to facilitate interpersonal interactions and collaboration from across the globe.

Traditional artificial reality systems may incorporate hands-on controllers that enable users to enter input capable of modifying their artificial reality experiences. Unfortunately, these hands-on controllers may limit the users' mobility and/or movements, especially hand-based actions and/or gestures. To resolve these limitations, some artificial reality systems may incorporate traditional wearables capable of sensing a few motions and/or gestures made by users. The sensing of some motions and/or gestures, however, has proved challenging and/or impracticable via such traditional wearables.

The instant disclosure, therefore, identifies and addresses a need for additional apparatuses, systems, and methods for directional acoustic sensing via wearables donned by users of artificial reality systems.

SUMMARY

As will be described in greater detail below, the instant disclosure generally relates to apparatuses, systems, and methods for directional acoustic sensing via wearables donned by users of artificial reality systems. In some embodiments, an apparatus may include a wearable dimensioned to be donned by a user of an artificial reality system. The apparatus may also include a signal generator that is incorporated into the wearable. The signal generator may propagate an acoustic wave via a body of the user toward a specific body part. The apparatus may further include an acoustic sensor that is incorporated into the wearable. The acoustic sensor may detect an acoustic reflection of the acoustic wave propagated by the signal generator. The apparatus may additionally include at least one processing device communicatively coupled to the acoustic sensor. The processing device may determine, based at least in part on the acoustic reflection, that the specific body part has made physical contact with an object. In response to this determination, the processing device may generate an input command for the artificial reality system that accounts for the specific body part making physical contact with the object.

In some examples, the signal generator may include a directional transducer that emits the acoustic wave in a specific direction. In such examples, the signal generator may be positioned within the wearable such that the directional transducer propagates the acoustic wave toward the specific body part via the body of the user. The directional transducer may be calibrated to steer the acoustic wave toward the specific body part via the body of the user.

In some examples, the wearable may include a wristband dimensioned to be donned on a wrist of the user. In such examples, the signal generator may be positioned within the wristband to be proximate to a skin surface of the user such that the directional transducer propagates the acoustic wave toward the specific body part via the skin surface and/or one or more bones of the user. Additionally or alternatively, the acoustic sensor may be positioned within the wristband to be proximate to a skin surface of the user to facilitate detection of the acoustic reflection via the body of the user. In this example, the acoustic reflection may have propagated from the specific body part to the wristband via the skin surface and/or one or more bones of the user.

In some examples, the processing device may monitor the acoustic reflection over a certain period of time. While monitoring the acoustic reflection, the processing device may detect a change in the acoustic reflection. The processing device may determine that the change detected in the acoustic reflection is indicative of physical contact made by the specific body part.

In addition, while monitoring the acoustic reflection, the processing device may detect a dampening in the acoustic reflection. In such examples, the processing device may determine that the dampening detected in the acoustic reflection is indicative of physical contact made by the specific body part.

In some examples, the processing device may detect a subsequent change in the acoustic reflection. In such examples, the processing device may determine, based at least in part on the subsequent change detected in the acoustic reflection, that the specific body part is no longer in physical contact with the object. The processing device may then facilitate further modifying the virtual component of the virtual reality system to account for the specific body part no longer being in physical contact with the object.

In some examples, the processing device may detect a rebound in acoustic reflection. In such examples, the processing device may determine that the rebound detected in the acoustic reflection is indicative of the specific body part releasing the object.

In some examples, the processing device may compare the acoustic reflection to at least one signature that represents an acoustic profile of the specific body part making physical contact with the object. In such examples, the processing device may determine, based at least in part on the comparison of the acoustic reflection and the signature, that the acoustic reflection matches the signature. The processing device may then determine, due at least in part to the acoustic reflection matching the signature, that the specific body part has made physical contact with the object.

In some examples, the processing device may process the acoustic reflection via a machine learning model. In such examples, the processing device may detect, within the acoustic reflection via the machine learning model, a pattern indicative of the specific body part making physical contact with the object. The processing device may then determine that the specific body part has made physical contact with the object based at least in part on the pattern detected within the acoustic reflection via the machine learning model. In one example, the processing device may facilitate modifying at least one virtual component of the artificial reality system to account for the specific body part making physical contact with the object.

A corresponding wearable may include a fastener dimensioned to facilitate securing the wearable to a user of an artificial reality system. The wearable may also include a signal generator that propagates an acoustic wave via a body of the user toward a specific body part. The wearable may further include an acoustic sensor that detects an acoustic reflection of the acoustic wave propagated by the signal generator. The wearable may additionally include at least one processing device communicatively coupled to the acoustic sensor. The processing device may determine, based at least in part on the acoustic reflection, that the specific body part has made physical contact with an object. In response to this determination, the processing device may generate an input command for the artificial reality system that accounts for the specific body part making physical contact with the object.

A corresponding method may include (1) propagating, by a signal generator incorporated into a wearable donned by a user of an artificial reality system, an acoustic wave via a body of the user toward a specific body part, (2) detecting, by an acoustic sensor incorporated into the wearable, an acoustic reflection of the acoustic wave propagated by the signal generator, (3) determining, based at least in part on the acoustic reflection detected by the acoustic sensor, that the specific body part has made physical contact with an object, and then in response to determining that the specific body part has made physical contact with the object, (4) generating an input command for the artificial reality system that accounts for the specific body part making physical contact with the object.

Various advantages of the present application will be apparent in light of the descriptions below.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures and description.

Figure 1:
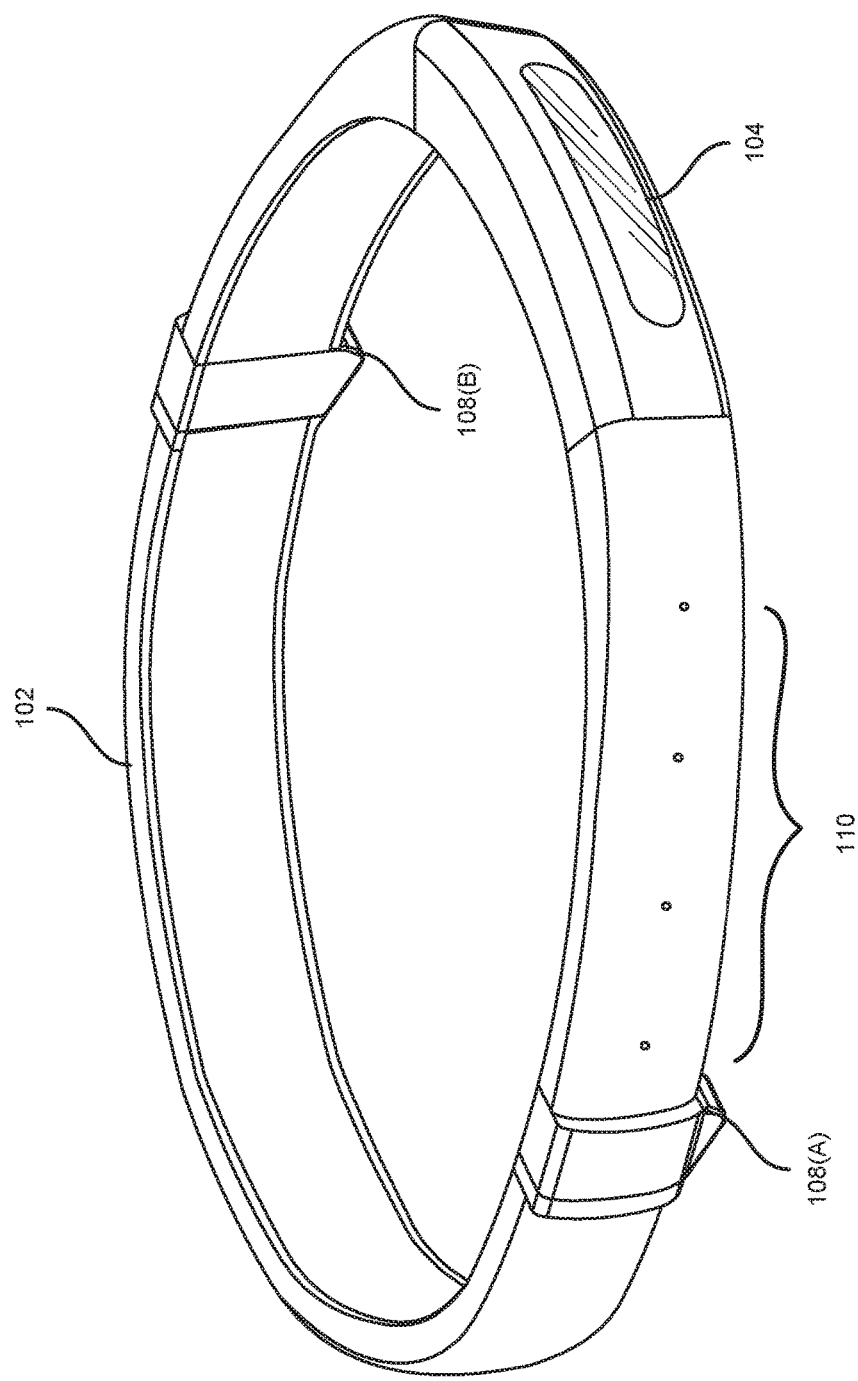
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for directional acoustic sensing via wearables donned by users of artificial reality systems. As will be explained in greater detail below, embodiments of the present disclosure may enable users of artificial reality systems to provide hands-free user input that modifies their artificial reality experiences. For example, a wristband donned by a user may implement directional acoustic sensing in connection with the user's fingers. In this example, the directional acoustic sensing implemented by the wristband may facilitate the detection of physical touch and release by the user's fingers. Additionally or alternatively, such directional acoustic sensing may enable the wristband to distinguish, disambiguate, and/or differentiate the physical touch and/or release of one of the user's fingers relative to the physical touch and/or release of another one of the user's fingers.

Figure 2:
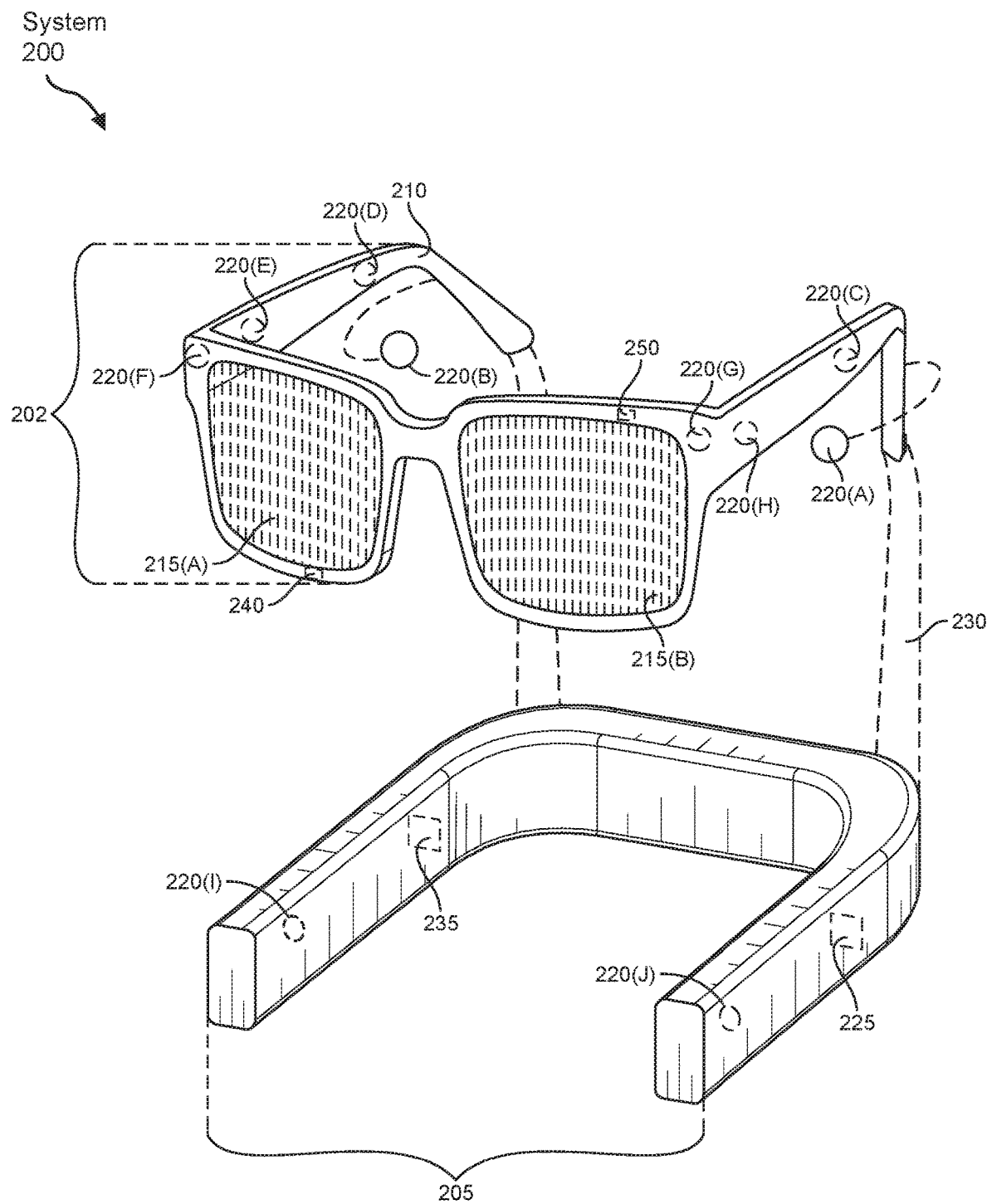
FIG. 2 illustrates an embodiment of an augmented reality headset and a corresponding neckband.
Figure 3:
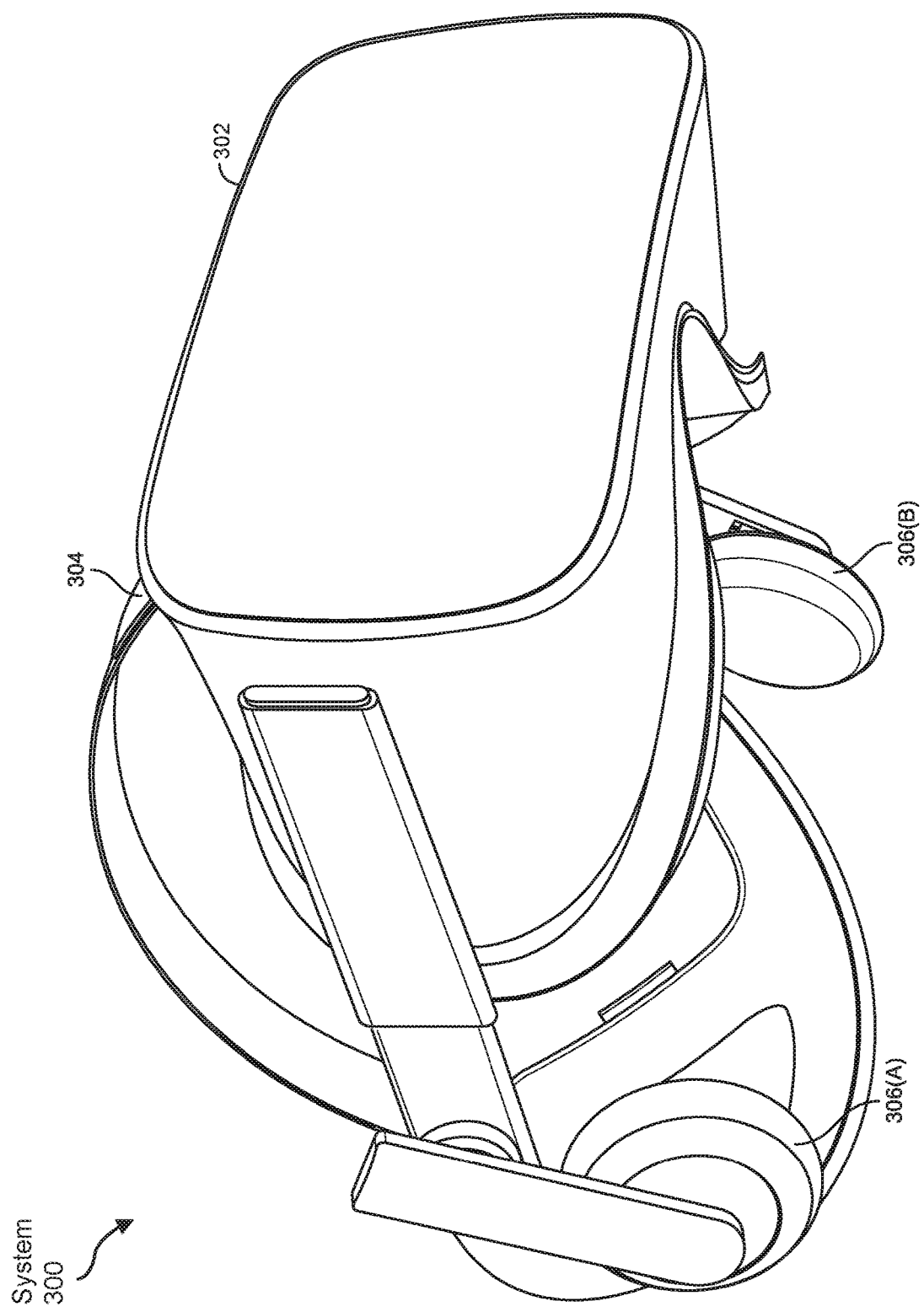
FIG. 3 illustrates an embodiment of a virtual reality headset.

The following will provide, with reference to FIGS. 1-3, detailed descriptions of various types of exemplary artificial reality devices that may facilitate and/or contribute to a user's artificial reality experience. Detailed descriptions of exemplary apparatuses and/or systems that implement directional acoustic sensing via wearables will be described in connection with FIGS. 4-7. Detailed descriptions of an exemplary acoustic reflection detected by a wearable will be described in connection with FIG. 8. In addition, the discussion corresponding to FIG. 9 will provide detailed descriptions of an exemplary method for directional acoustic sensing via wearables donned by users of artificial reality systems.

Embodiments of the instant disclosure may include or be implemented in conjunction with various types of artificial reality systems. Artificial reality may constitute a form of reality that has been altered by virtual objects for presentation to a user. Such artificial reality may include and/or represent VR, AR, MR, hybrid reality, or some combination and/or variation of one or more of the same. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, AR system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between neckband acoustic sensors 220(I) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

The artificial reality systems described above in connection with FIGS. 1-3 may facilitate and/or contribute to artificial reality experiences for users donning wearables that implement directional acoustic sensing. As will be described in greater detail below in connection with FIGS. 4-9, such directional acoustic sensing may provide users with a dynamic hands-free mechanism for detecting the physical touch and release of users' fingers.

Figure 4:
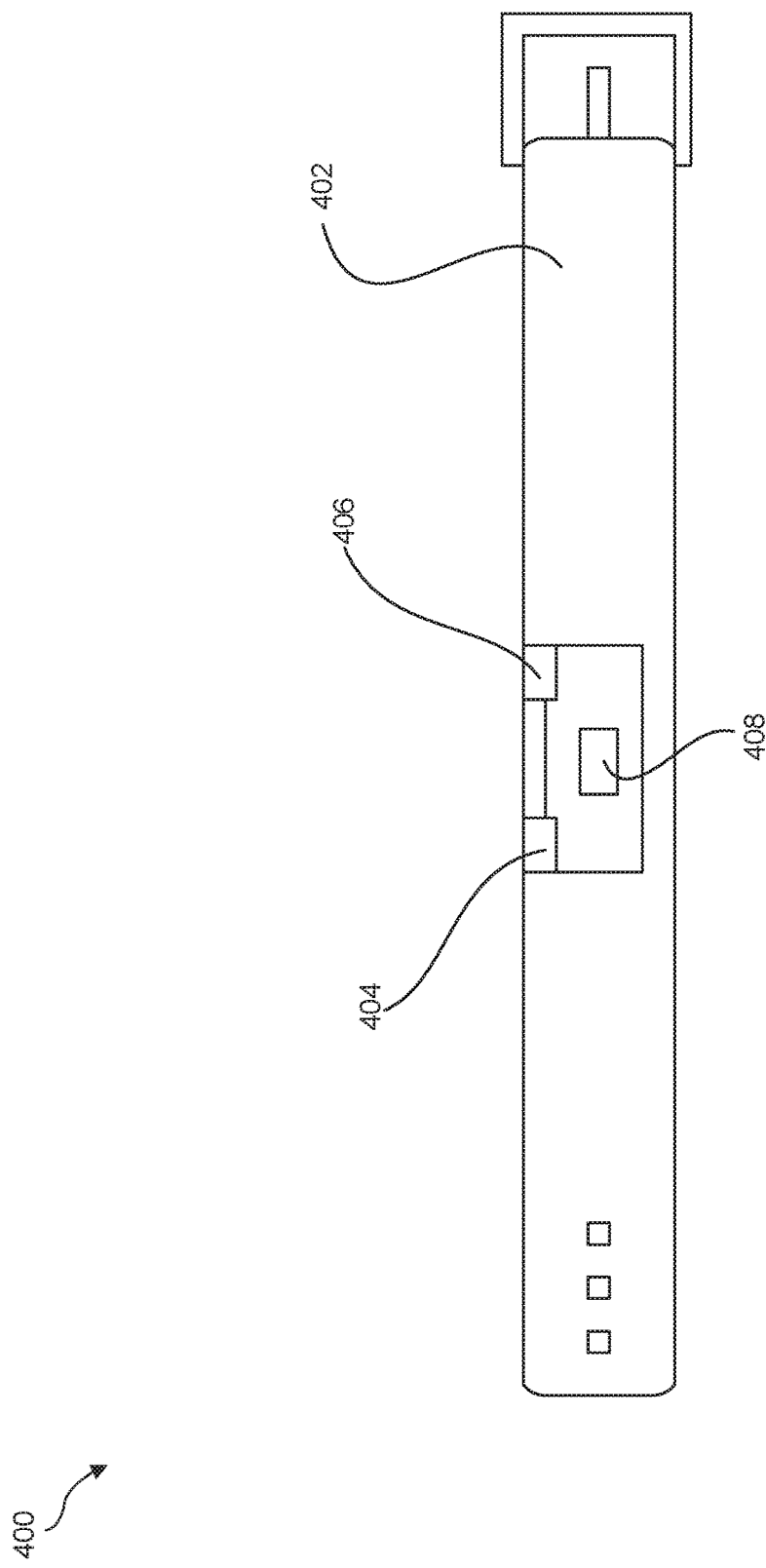
FIG. 4 illustrates an exemplary wearable that facilitates directional acoustic sensing for users of artificial reality systems.

FIG. 4 is a block diagram of an exemplary wearable 400 that facilitates directional acoustic sensing when donned by a user of an artificial reality system. As illustrated in this figure, exemplary wearable 400 may include a signal generator 404, an acoustic sensor 406, a processing device 408, and a wristband 402. In one example, wearable 400 may be dimensioned to be donned and/or worn by a user of an artificial reality system. For example, the user may fasten wearable to his or her wrist via wristband 402. The term "wearable," as used herein, generally refers to any type or form of computing device that is worn by a user as part of an article of clothing, an accessory, and/or an implant.

Signal generator 404 may include and/or represent an electrical device that generates and/or produces acoustic waves. In some examples, signal generator 404 may incorporate and/or be communicatively coupled to an electroacoustic transducer, such as a speaker, that converts an electrical signal to an acoustic wave. In one example, the acoustic wave may propagate at a frequency within the audible range of human hearing (e.g., between 20 and 20,000 hertz). In another example, the acoustic wave may propagate at a frequency outside the audible range of human hearing. The acoustic wave may exist and/or operate in the analog domain and/or the digital domain.

In other examples, signal generator 406 may include and/or represent one or more actuators incorporated in and/or coupled to wristband 402. For example, signal generator 406 may include and/or represent one or more piezoelectric actuators and/or vibrotactile actuators (sometimes referred to as vibrotactors). In one example, these vibrotactors may be configured to vibrate in unison or independently to provide certain haptic sensations to a user. Additionally or alternatively, such vibrotactors may be configured to generate and/or produce acoustic waves for the purpose of directional acoustic sensing.

Acoustic sensor 406 may include and/or represent an electroacoustic transducer that detects acoustic waves. For example, acoustic sensor 406 may include and/or represent a microphone that converts an acoustic wave into an electrical signal. Additionally or alternatively, acoustic sensor 406 may include and/or represent a type of MicroElectro-Mechanical System (MEMS) that senses and/or measures a surface acoustic wave. In one example, the acoustic wave detected by acoustic sensor 406 may constitute and/or represent a reflection and/or echo of an acoustic wave generated by signal generator 404. In this example, the acoustic wave generated by signal generator 404 may bounce off an object and return from the object to wearable 400. As the acoustic wave returns to wearable 400, acoustic sensor 406 may detect and/or sense the acoustic wave.

Processing device 408 may include and/or represent a hardware-implemented processing device capable of interpreting and/or executing computer-readable instructions. In one example, processing device 408 may obtain electrical signals representative of acoustic waves detected by acoustic sensor 406. Additionally or alternatively, processing device 408 may obtain computer-readable data representative of acoustic waves detected by acoustic sensor 406. Either way, processing device 408 may analyze the acoustic waves for evidence of whether such waves originated from signal generator 404, bounced off an object, and then returned to wearable 400. When wearable 400 is donned by a user of an artificial reality system, such evidence may indicate and/or be used to determine that the user has touched and/or released an object. In response to determining that the user has touched and/or released an object, processing device 408 may cause and/or direct the artificial reality system to modify the user's artificial reality experience to account for such touching and/or releasing.

Wristband 402 may include and/or represent a strap designed and/or dimensioned to at least partially encompass the wrist of a user of an artificial reality system. Wristband 402 may include and/or contain a variety of different materials. Examples of such materials include, without limitation, cottons, polyesters, nylons, elastics, plastics, neoprene, rubbers, metals, combinations or variations of one or more of the same, and/or any other suitable materials. Wristband 402 may be defined and/or formed in a variety of shapes and/or sizes with the aim of securing to the wrist of a user of an artificial reality system. In some examples, wristband 402 may be adjustable to provide a one-size-fits-most feature.

In addition to the various components illustrated in FIG. 4, exemplary wearable 400 may include one or more other components that are not illustrated and/or labelled in FIG. 4. For example, wearable 400 may include and/or incorporate batteries, electronic assemblies, communication interfaces or devices, and/or fasteners. An apparatus for directional acoustic sensing may include and/or represent all or a portion of wearable 400 in FIG. 4. Accordingly, wearable 400 in FIG. 4 may, on its own, constitute and/or amount to an apparatus or system for directional acoustic sensing.

Although exemplary wearable 400 includes the various components illustrated in FIG. 4, other embodiments of such wearables may omit and/or exclude one or more of those components. For example, an exemplary wearable may include signal generator 404, acoustic sensor 406, and wristband 402 but exclude processing device 408. In this example, instead of being incorporated into wearable 400, processing device 408 may be incorporated into a head-mounted display that is worn on a user's face and/or presents visual content to the user. Continuing with this example, processing device 408 incorporated into the head-mounted display may be communicatively coupled to acoustic sensor 406 and/or a different processing device incorporated into wearable 400 via a wireless or wired communication interface.

In some examples, both wearable 400 and the head-mounted display may incorporate and/or include separate processing devices. In such examples, some of the processing described in connection with sensing touch and/or release may be performed by the processing device incorporated into wearable 400. Additionally or alternatively, some of the processing described in connection with sensing touch and/or release herein may be performed by the processing device incorporated into the head-mounted display. Accordingly, any of the processing described in connection with sensing touch and/or release may be performed at the wearable and/or the head-mounted display.

Figure 5:
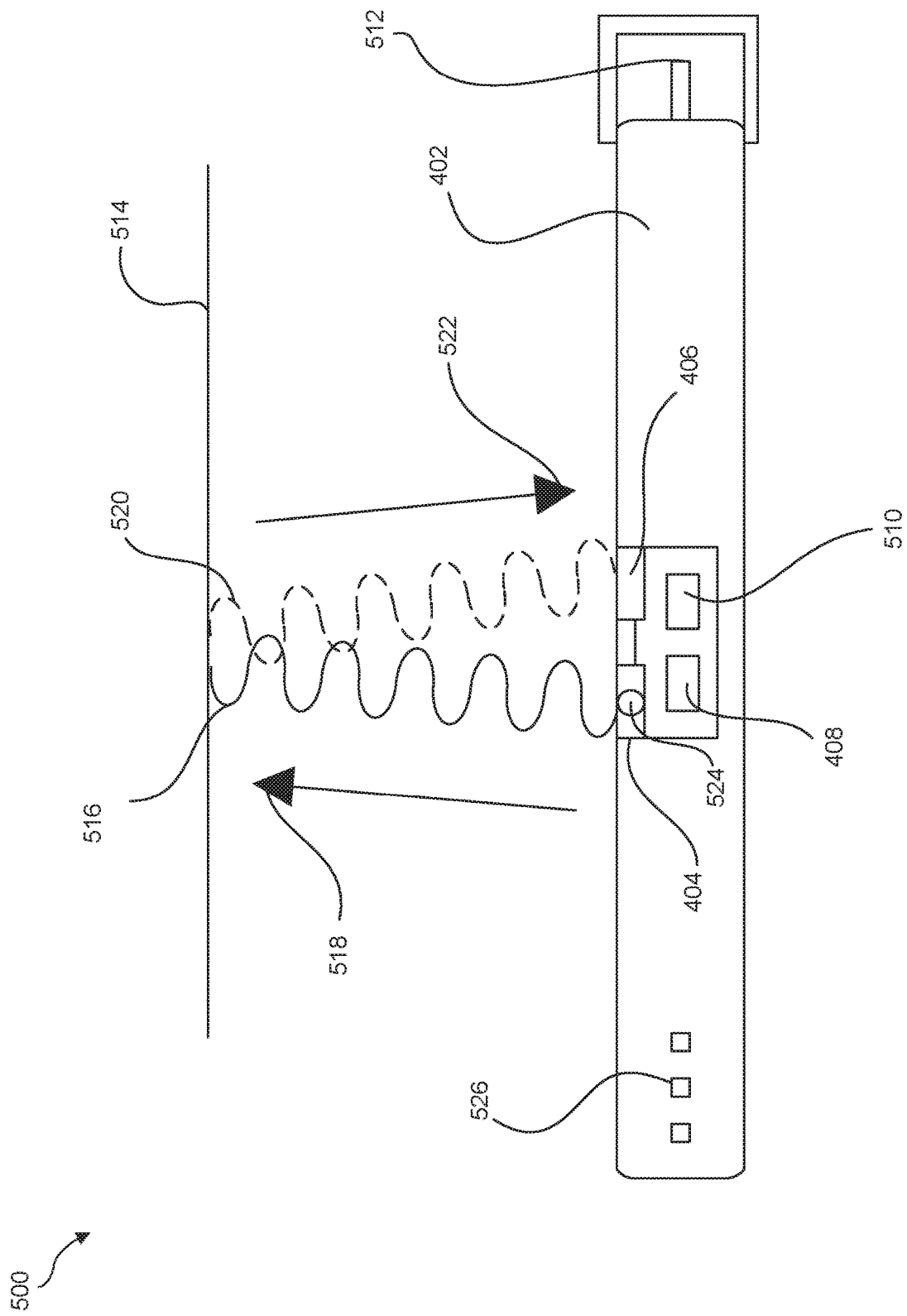
FIG. 5 depicts certain principles of operation of the exemplary wearable illustrated in FIG. 4.

FIG. 5 is an illustration of an exemplary implementation 500 that demonstrates general principles of operation of exemplary wearable 400 from FIG. 4. As illustrated in FIG. 5, exemplary wearable 400 may include signal generator 404, acoustic sensor 406, processing device 408, and wristband 402. Wearable 400 may also include a transmitter 510 capable of sending messages to a head-mounted display worn by a user who is donning wearable 400. In some examples, these messages may facilitate modifying certain virtual components (e.g., graphics and/or image frames) of the artificial reality system to account for physical contact detected and/or sensed by wearable 400.

In one example, signal generator 404 may generate an acoustic wave 516. In this example, signal generator 404 may propagate acoustic wave 516 in the direction of arrow 518. For example, signal generator 404 may include a directional acoustic transducer 524 that emits acoustic wave 516 in the direction of arrow 518. Examples of directional acoustic transducer 524 include, without limitation, voice coil speakers, ribbon speakers, electrostatic speakers, piezoelectric speakers, bone conduction transducers, cartilage conduction transducers, and/or any other suitable type or form of suitable audio transducer.

In some examples, directional acoustic transducer 524 may be steerable such that acoustic wave 516 is directed and/or aimed at a specific target and/or in a specific direction. In one example, when wearable 400 is donned by the user, directional acoustic transducer 524 may be positioned and/or calibrated within wearable 400 to propagate acoustic wave 516 toward a specific body part of the user. For example, although not illustrated in this way in FIG. 4, directional acoustic transducer 524 may be positioned and/or calibrated within wearable 400 to propagate acoustic wave 516 toward a specific finger on the hand of the user. In this example, directional acoustic transducer 524 may emit acoustic wave 516 from the wrist of the user such that acoustic wave 516 propagates toward the specific finger via the user's body (e.g., skin and/or bone).

In some examples, the user's body may serve as the medium through which acoustic wave 516 traverses from wearable 400 to the specific body part. In one example, the user's body may include organic matter capable of carrying acoustic wave 516 from the wrist to a specific finger. For example, the skin and/or bones between the user's wrist and the specific finger may facilitate the acoustic wave's propagation and/or traversal.

As illustrated in FIG. 5, exemplary implementation 500 may include an object 514 that reflects acoustic wave 516 back toward wearable 400. In some examples, object 514 may include and/or represent an inanimate article or item, such as a wall, a table, a counter, a ball, and/or a pad, among other things. In other examples, object 514 may include and/or represent a human body part, such as an arm and/or hand of the user, the user's chest, and/or a body part of another person besides the user.

In one example, acoustic wave 516 may bounce and/or echo off object 514, thereby creating acoustic reflection 520 of acoustic wave 516. In this example, acoustic reflection 520 may traverse back toward wearable 400 in the direction of arrow 522. The directions of arrows 518 and 522 may be substantially opposite of one another. Accordingly, acoustic wave 516 may traverse from wearable 400 toward object 514 in the direction of arrow 518, and then acoustic reflection 520 may traverse from object 514 back toward wearable 400 in the direction of arrow 522.

As acoustic reflection 520 arrives at wearable 400, acoustic sensor 406 may detect and/or sense acoustic reflection 520. In response to detecting and/or sensing acoustic reflection 520, acoustic sensor 406 may produce and/or provide an output that accounts for acoustic reflection 520 and/or demonstrates the presence of object 514. Accordingly, this output produced by acoustic sensor 406 may indicate and/or be used to determine that object 514 is touched and/or released by the user donning wearable 400.

In some examples, when the user is not touching object 514, acoustic sensor 406 may detect and/or sense no acoustic reflection. In such examples, acoustic sensor 406 may produce and/or provide a baseline reading in the absence of acoustic reflection 520. For example, when the user is not touching object 514, acoustic wave 516 may not be reflected back toward wearable 400 by object 514. Without detecting and/or sensing such a reflection, acoustic sensor 406 may produce and/or provide an output that accounts for the lack of such a reflection and/or demonstrates the absence of such touching. Accordingly, this output produced by acoustic sensor 406 may indicate and/or be used to determine that object 514 is not currently touched or has been released by the user donning wearable 400.

In some examples, processing device 408 may determine that a specific body part (e.g., a finger or hand) of the user has made physical contact with object 514 based at least in part on acoustic reflection 520. In some examples, processing device 408 may monitor acoustic reflection 520 based at least in part on the output of acoustic sensor 406. For example, the output of acoustic sensor 406 may be commensurate with and/or represent the level of acoustic reflection 520 measured at wearable 400. In one example, a dampening and/or subsidence in the output of acoustic sensor 406 may indicate and/or suggest that the user has touched or is touching some kind of object. Additionally or alternatively, a rebound and/or resurgence in the output of acoustic sensor 406 may indicate and/or suggest that the user has released the object after having touched it.

In some examples, processing device 408 may monitor acoustic reflection 520 for changes, variations, and deviations via the output of acoustic sensor 406. In some examples, processing device 408 may determine that certain changes, variations, and/or deviations detected in the output of acoustic sensor 406 are indicative of touching and/or releasing done with the specific body part. As a specific example, processing device 408 may detect a dampening in the output of acoustic sensor 406. Processing device 408 may then determine that the dampening in the output of acoustic sensor 406 indicates that the user has touched an object.

Continuing with this example, processing device 408 may detect a rebound in the output of acoustic sensor 406. Processing device 408 may then determine that the rebound in the output of acoustic sensor 406 indicates that the user has released the object after having touched it.

In response to determining that the specific body part has made and/or released physical contact with the object, processing device 408 may generate an input command for the artificial reality system that accounts for the specific body part making physical contact with the object. In some examples, processing device 408 may facilitate modifying at least one virtual component of the artificial reality system to account for the specific body part making and/or releasing physical contact with the object. Processing device 408 may facilitate such modifications in a variety of different ways and contexts. For example, processing device 408 may send a message to a head-mounted display worn by the user of the artificial reality system. Examples of this message include, without limitation, commands, computer-readable instructions, information and/or data indicative of the user touching and/or releasing an object, combinations or variations of one or more of the same, and/or any other suitable message.

In some examples, the head-mounted display may then modify the user's artificial reality experience and/or visualization to account for the user touching and/or releasing the object. For example, the touching of the object may signify and/or correspond to the pressing and/or selection of a button within the user's artificial reality experience. In this example, the head-mounted display may generate and/or modify certain graphics or image frames for presentation to the user. These graphics or image frames may take into account that the user has pressed and/or selected the button within the user's artificial reality experience.

As another example, the touching of the object may signify and/or correspond to the touching of a certain surface within the user's artificial reality experience. In this example, the head-mounted display may generate and/or modify certain graphics or image frames for presentation to the user. These graphics or image frames may show the user touching that surface within the user's artificial reality experience.

Additionally or alternatively, the releasing of the object may signify and/or correspond to the releasing of that surface within the user's artificial reality experience. In this example, the head-mounted display may generate and/or modify certain graphics or image frames for presentation to the user. These graphics or image frames may show the user lifting his or her finger from that surface within the user's artificial reality experience.

In other examples, processing device 408 may store the input command in connection with the artificial reality system without necessarily modifying a virtual component of the artificial reality system. For example, processing device 408 may store a tag and/or metadata for the artificial reality system in response to the physical contact made by the user's body part. In this example, the tag and/or metadata may not necessarily modify any virtual components of the artificial reality system.

As illustrated in FIG. 5, wearable 400 may include a fastener 512 that facilitates securing wristband 402 to the wrist of the user. In one example, fastener 512 may interface with a receptacle 526 formed by wristband 402. In this example, when wristband 402 encompasses the wrist of the user and fastener 512 is secured to receptacle 526, the combination of fastener 512 and receptacle 526 may effectively attach and/or hold wristband 402 in place on the wrist of the user. Although fastener 512 is illustrated as a specific embodiment in FIG. 5, various other embodiments of fasteners may accomplish the same objective and thus be substituted for fastener 512. Examples of such fasteners include, without limitation, members, pegs, pins, clamps, clips, latches, snaps, zippers, rivets, hook and loop combinations, combinations or variations of one or more of the same, and/or any other suitable fasteners.

Figure 6:
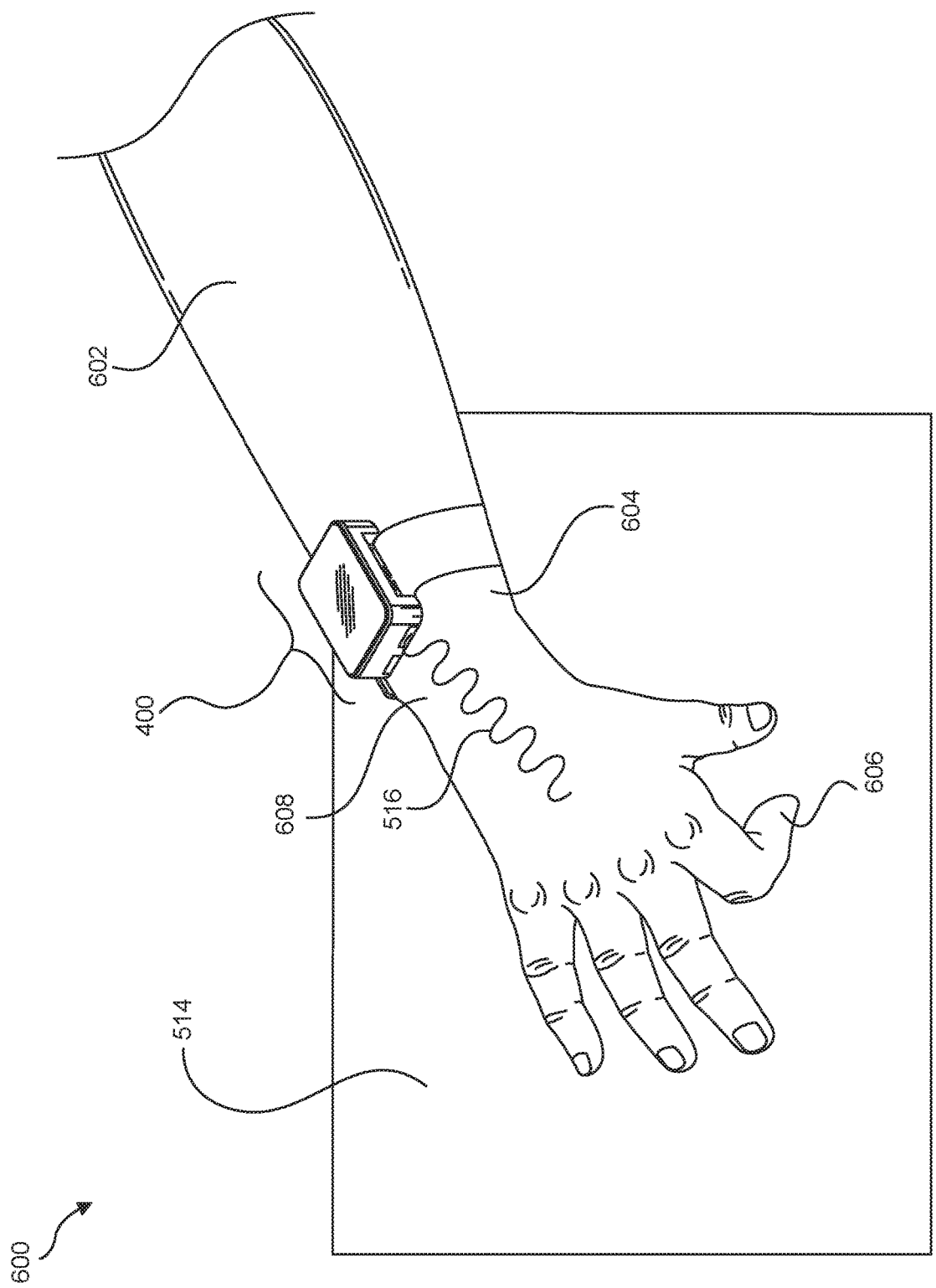
FIG. 6 is an illustration in which a user donning an exemplary wearable makes physical contact with an object.

FIG. 6 is an illustration of an exemplary implementation 600 in which a user 602 donning wearable 400 makes physical contact with object 514. As illustrated in FIG. 6, user 602 may don wearable 400 on a wrist 604 of his or her right arm. In some examples, the user may calibrate directional transducer 524 on wearable 400 to steer and/or point acoustic wave 516 generated by signal generator 404 toward an index finger 606 of the user. In one example, the user may perform this calibration mechanically by altering and/or moving the orientation of directional transducer 524, signal generator 404, and/or wearable 400. Additionally or alternatively, wearable 400 may perform a form of self-calibration byway of automated electrical and/or mechanical processes designed to customize, tailor, and/or personalize the steering and/or aim of directional transducer 524 to the individual user.

As illustrated in FIG. 6, signal generator 404 may propagate acoustic wave 516 via a body 608 of the user toward index finger 606. In this example, body 608 may include and/or represent a skin surface and/or bone structure of the user. Acoustic wave 516 may traverse body 608 of the user until reaching object 514 by way of index finger 606. Upon reaching object 514, acoustic wave 516 may bounce off object 514, thereby creating acoustic reflection 520 (not illustrated in FIG. 6), which heads back toward wearable 400. While heading back toward wearable 400, acoustic reflection 520 may pass through index finger 606 and/or body 608 of the user.

In some examples, signal generator 404 may be positioned within wearable 400 such that directional transducer 524 is aimed at and/or steered toward index finger 606. In one example, signal generator 404 may be positioned proximate to and/or interface directly with the skin surface of the user within wristband 402. In this position, directional transducer 524 may be able to propagate acoustic wave 516 toward index finger 606 via the skin and/or bones of the user.

Similarly, acoustic sensor 406 may be positioned within wearable 400 to receive acoustic reflection 520 via body 608 of the user. In one example, acoustic sensor 406 may be positioned proximate to and/or interface directly with the skin surface of the user within wristband 402. In this position, acoustic sensor 406 may facilitate detection and/or sensing of acoustic reflection 520 via body 608 of the user as acoustic reflection 520 arrives at wearable 400.

In some examples, acoustic sensor 406 may produce an output that is commensurate to its acoustic reading at any given time. Accordingly, the output produced by acoustic sensor 406 may indicate when user 602 touches and/or releases object 514 based on certain changes exhibited. For example, acoustic measurements taken by acoustic sensor 406 may indicate and/or exhibit certain changes in the acoustic levels at the user's wrist based on physical contact made and/or released by the user. In one example, a dampening and/or subsidence in the acoustic reading may indicate and/or suggest that the user has just touched with object 514. Additionally or alternatively, a rebound and/or resurgence in the acoustic reading may indicate and/or suggest that the user has just released and/or is no longer touching object 514. The meaning and/or significance of these indicators (e.g., dampening versus rebounding) with respect to the user's physical contact may also be swapped depending on the configuration and/or design of acoustic sensor 406.

Figure 7:
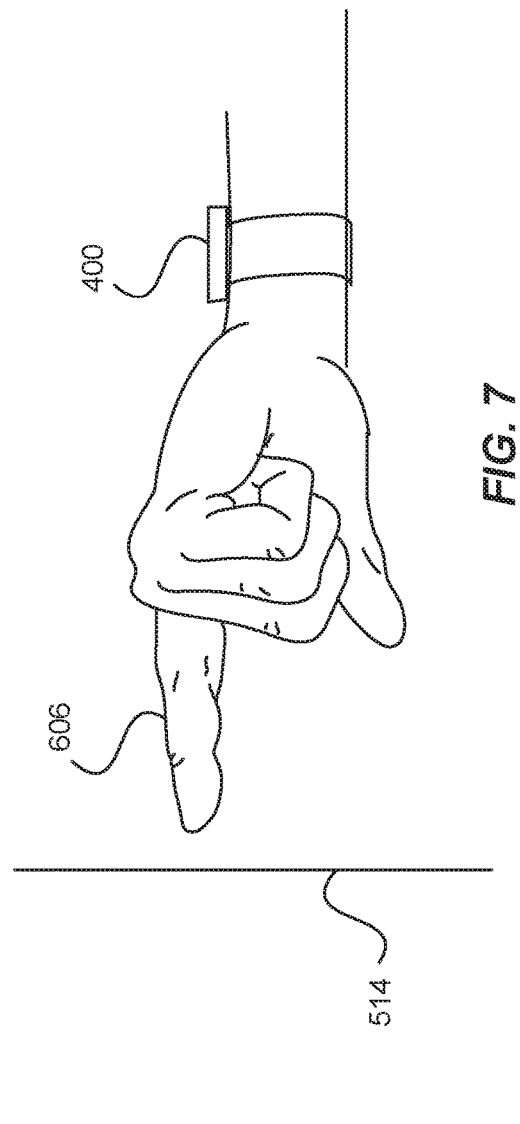
FIG. 7 is an additional illustration in which a user donning an exemplary wearable makes physical contact with an object.
Figure 8:
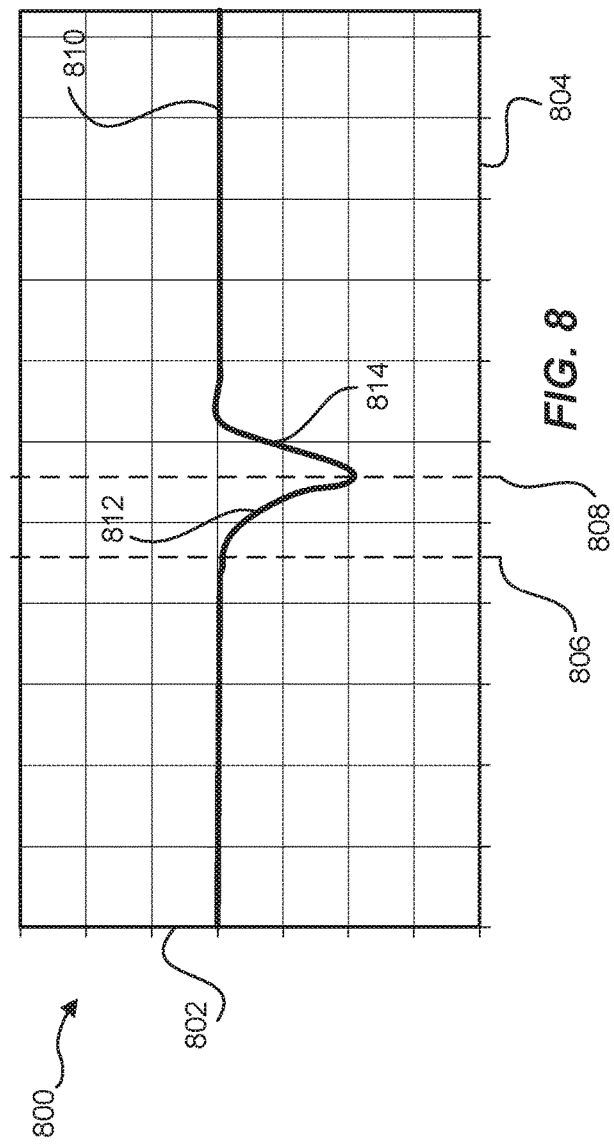
FIG. 8 is an illustration of an exemplary acoustic reflection detected by an acoustic sensor incorporated into a wearable donned by a user of an artificial reality system.

FIG. 7 is an illustration of a user making physical contact with object 514 while donning wearable 400, and FIG. 8 is an illustration of an exemplary representation 800 of an output 810 produced by acoustic sensor 406 as the user makes the physical contact depicted in FIG. 7. As illustrated in FIG. 7, the user may touch object 514 with index finger 606. In one example, signal generator 404 may propagate an acoustic wave via skin and/or bone toward index finger 606. In this example, acoustic sensor 406 may detect an acoustic reflection of that acoustic wave.

As illustrated in FIG. 8, exemplary representation 800 may depict output 810 that overlays a reference graph consisting of an x-axis 804 and a y-axis 802. In one example, x-axis 804 may correspond to and/or represent time. In this example, y-axis 802 may correspond to and/or represent voltage. Accordingly, output 810 may constitute a voltage level that is commensurate to the measurement of acoustic reflection 520 taken by acoustic sensor 406 over a certain period of time.

As illustrated in FIG. 8, exemplary representation 800 may also include a time marker 806 that marks and/or identifies the point in time at which the user illustrated in FIG. 7 makes physical contact with object 514. As the user makes physical contact with object 514, output 810 may experience and/or exhibit a dampening 812. Accordingly, dampening 812 may indicate and/or be used to determine that the user has touched some kind of object (e.g., object 514).

In addition, exemplary representation 800 may include a time marker 808 that marks and/or identifies the point in time at which the user illustrated in FIG. 7 releases object 514 such that index finger 606 is no longer touching object 514. As the user releases object 514, output 810 may experience and/or exhibit a rebound 814. Accordingly, rebound 814 may indicate and/or be used to determine that the user has released the object.

In some examples, processing device 408 may monitor acoustic reflection 520 based at least in part on the output of acoustic sensor 406. For example, the output of acoustic sensor 406 may be commensurate with and/or represent the level of acoustic reflection 520 measured at wearable 400. In this example, processing device 408 may monitor acoustic reflection 520 for changes, variations, and deviations via the output of acoustic sensor 406.

In some examples, wearable 400 may be able to distinguish, disambiguate, and/or differentiate the physical touch and/or release of one of the user's fingers relative to the physical touch and/or release of another one of the user's fingers. In one example, wearable 400 may include multiple signal generators that are each calibrated to steer acoustic waves toward different fingers on the user's hand. For example, one signal generator may propagate an acoustic wave toward the user's index finger, and another signal generator may propagate another acoustic wave toward the user's middle finger. In this example, wearable 400 may sweep across the signal generators one at a time to facilitate determining whether the user's index finger and/or middle finger ever touches or releases an object. This sweeping may ensure that only one of the signal generators is propagating an acoustic wave at any given time.

Additionally or alternatively, wearable 400 may incorporate multiple acoustic sensors that are synchronized with and/or tuned to the multiple signal generators. For example, one acoustic sensor may be synchronized with and/or tuned to the signal generator aimed toward the user's index finger, and another acoustic sensor may be synchronized with and/or tuned to the other signal generator aimed toward the user's middle finger. In this example, the signal generators may generate and/or propagate acoustic waves of different frequencies, and the acoustic sensors may apply and/or incorporate certain filters (e.g., low pass filters, high pass filters, and/or band pass filters) to facilitate the pairing of signal generators and acoustic sensors within wearable 400 and/or differentiating physical contact made by the index finger and the middle finger.

In some examples, wearable 400 and/or the head-mounted display may implement one or more machine learning algorithms and/or models to facilitate the detection, identification, and/or classification of certain touching and/or releasing done by the user. For example, wearable 400 and/or the head-mounted display may be programmed and/or configured with a fully and/or partially constructed machine learning model (such as a convolutional neural network and/or a recurrent neural network). In one example, wearable 400 and/or the head-mounted display may include and/or incorporate a storage device that stores the machine learning model. The machine learning model may be trained and/or constructed with training data that includes various samples of acoustic reflections detected by acoustic sensors.

Some of these samples may represent and/or be indicative of a user touching an object with a specific body part and/or releasing an object with that body part. These samples may constitute positive data for the purpose of training the machine learning model. Other samples may represent and/or be indicative of a user neither touching nor releasing an object with that body part. These other samples may constitute negative data for the purpose of training the machine learning model.

In some examples, one or more of these samples may be supplied by a pool of indiscriminate users whose data is collected by the manufacturer of wearable 400 for the purpose of training the machine learning model. In one example, one or more of these samples may also be supplied by the end user donning wearable 400 and/or operating the artificial reality system. For example, the user may calibrate and/or train the machine learning model implemented on wearable 400 to recognize his or her rendition of touching and/or releasing (because one person's rendition of touching and/or releasing may cause a different acoustic signature and/or profile than another's). To do so, the user may perform one or more instances of touching and/or releasing an object with a specific body part, thereby generating one or more acoustic reflections. These acoustic reflections may represent and/or serve as samples of the user's rendition of such touching and/or releasing.

Continuing with this example, processing device 408 may capture those samples of the acoustic reflections detected by acoustic sensor 406 while the user performs touching and/or releasing with a specific body part. Processing device 406 may then calibrate the machine learning model to recognize such touching and/or releasing as performed by the user.

Upon training and/or calibrating the machine learning model, processing device 408 may be able to classify acoustic reflections detected by acoustic sensor 406 as touching, releasing, and/or neither touching nor releasing via the machine learning model. In other words, the machine learning model may indicate and/or determine whether any acoustic reflections detected at wearable 400 are meant by the user to communicate a touch- and/or release-based command and/or instruction to the artificial reality system. In one example, processing device 408 may receive an output that represents and/or accounts for an acoustic reflection from acoustic sensor 406. In this example, processing device 408 may analyze, classify, and/or process the output from acoustic sensor 406 via the machine learning model.

In some examples, processing device 408 may detect, within the acoustic reflection via the machine learning model, a pattern indicative of a specific body part making physical contact with an object. In such examples, processing device 408 may then determine that the specific body part has made physical contact with an object based at least in part on the pattern detected within the acoustic reflection via the machine learning model.

As a specific example, the machine learning model may represent a convolutional neural network that includes various layers, such as one or more convolution layers, activation layers, pooling layers, and fully connected layers. In this example, the electrical response may include and/or represent the most recent 100 milliseconds of acoustic reflection data outputted by acoustic sensor 406. Processing device 408 may pass the acoustic reflection data through the convolutional neural network to classify the acoustic reflection data as touching, releasing, and/or neither of the two.

In the convolutional neural network, the acoustic reflection data may first encounter the convolution layer. At the convolution layer, the 100 milliseconds of acoustic reflection data may be convolved using a filter and/or kernel. In particular, the convolution layer may cause processing device 408 to slide a matrix function window over and/or across the 100 milliseconds of acoustic reflection data. Processing device 408 may then record the resulting data convolved by the filter and/or kernel. In one example, one or more nodes included in the filter and/or kernel may be weighted by a certain magnitude and/or value.

After completion of the convolution layer, the convolved representation of the acoustic reflection data may encounter the activation layer. At the activation layer, the convolved acoustic reflection data may be subjected to a non-linear activation function. In one example, the activation layer may cause processing device 408 to apply the non-linear activation function to the convolved acoustic reflection data. By doing so, processing device 408 may be able to identify and/or learn certain non-linear patterns, correlations, and/or relationships between different regions of the convolved acoustic reflection data.

In some examples, processing device 408 may apply one or more of these layers included in the convolutional neural network to the acoustic reflection data multiple times. As the acoustic reflection data completes all the layers, the convolutional neural network may render a classification for the acoustic reflection data. In one example, the classification may indicate that the acoustic reflection data is indicative of the user touching an object with a specific body part. In another example, the classification may indicate that that the acoustic reflection data is indicative of the user releasing an object with a specific body part. Additionally or alternatively, the classification may indicate that that the acoustic reflection data is indicative of the user neither touching nor releasing an object with a specific body part.

In other examples, wearable 400 may maintain a set of signatures that represent acoustic profiles of different body parts making physical contact with an object. For example, one signature may define an output formation of acoustic sensor 406 that is indicative of the user touching an object with his index finger. This signature may include and/or amount to data that represents and/or correspond to a dampening in the output of acoustic sensor 406, as illustrated in FIG. 8. In this example, another signature may define another output formation of acoustic sensor 406 that is indicative of the user touching an object with his middle finger. These output formations defined by the signatures may differ from one another and thus correspond to different fingers. As a result, processing device 408 may be able to distinguish physical contact made by the index finger from physical contact made by the middle finger.

In some examples, processing device 408 may compare acoustic reflection 520 to the set of signatures maintained by wearable 400. More specifically, this comparison may involve the output generated by acoustic sensor 406 in response to acoustic reflection 520. In one example, processing device 408 may determine that acoustic reflection 520 matches the signature that represents the acoustic profile of the index finger, as opposed to the middle finger. Alternatively, processing device 408 may determine that acoustic reflection 520 matches the other signature that represents the acoustic profile of the middle finger, as opposed to the index finger.

Figure 9:
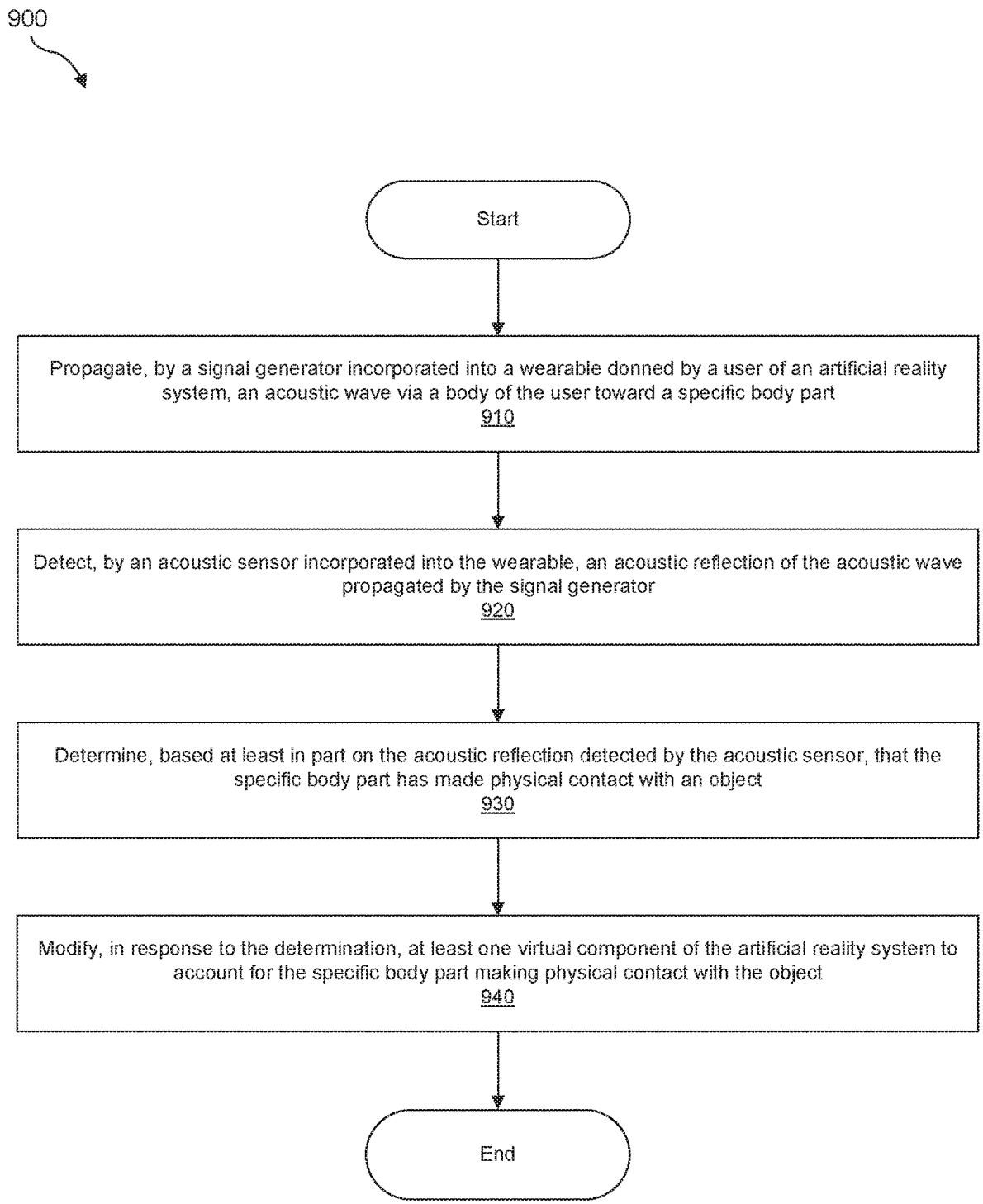
FIG. 9 is a flow diagram of an exemplary method for directional acoustic sensing via wearables donned by users of artificial reality systems.

FIG. 9 is a flow diagram of an exemplary method 900 for directional acoustic sensing via wearables donned by users of artificial reality systems. The steps shown in FIG. 9 may be performed by certain devices incorporated into a wearable of an artificial reality system. Moreover, the steps shown in FIG. 9 may also incorporate and/or involve various sub-steps and/or variations consistent with the descriptions provided above in connection with FIGS. 1-8.

As illustrated in FIG. 9, at step 910, a signal generator incorporated into a wearable donned by a user of an artificial reality system may propagate an acoustic wave via a body of the user toward a specific body part. For example, signal generator 404 may propagate acoustic wave 516 from wearable 400 on the user's wrist toward the user's index finger via skin and/or bone. In this example, signal generator 404 may include directional transducer 524 that interfaces with the user's skin and/or steers acoustic wave 518 in the direction of the user's index finger. Acoustic wave 518 may traverse the user's skin and/or bone until reaching the tip of the user's index finger.

At step 920 in FIG. 9, an acoustic sensor incorporated into the wearable may detect an acoustic reflection of the acoustic wave propagated by the signal generator. For example, in the event that the user is touching object 514 with his or her index finger, acoustic wave 516 may bounce off the object, thereby creating acoustic reflection 520. In this example, acoustic reflection 520 may traverse back toward wearable 400 from the tip of the user's index finger via the user's skin and/or bone. As acoustic reflection 520 arrives at wearable 400, acoustic sensor 406 may detect and/or sense acoustic reflection 520.

At step 930 in FIG. 9, a processing device may determine, based at least in part on the acoustic reflection, that the specific body part has made physical contact with an object. For example, processing device 408 and/or a processing device incorporated into a head-mounted display of the artificial reality system may determine that the user's index finger has touched an object based at least in part on acoustic reflection 520. More specifically, processing device 408 and/or the processing device incorporated into the head-mounted display may detect and/or identify a change in acoustic reflection 520 and then determine that this change is indicative of the user's index finger touching an object.

At step 940 in FIG. 9, a processing device may modify at least one virtual component of the artificial reality system to account for the specific body part making physical contact with the object. For example, processing device 408 and/or the processing device incorporated into the head-mounted display may modify one or more graphics included in image frames presented to the user via the head-mounted display. Such modifications to those graphics may account for the user's index finger having touched the object.

As described above in connection with FIGS. 4-9, a wearable device in the form of a wristband may be incorporated into an artificial reality system. This wearable device may be able to detect when a user touches and/or releases an object with one or more of his or her fingers. For example, the wearable device may include a signal generator that emits directional sound waves aimed at the user's index finger from the user's wrist. The wearable device may also include an acoustic sensor that detects any reflections of those directional sound waves when the user touches an object. This acoustic sensor may also detect a discontinuation of those reflections when the user releases the object. The wearable device may use the detection of those reflections and/or the discontinuation of the same to make certain changes to the user's artificial reality experience.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An apparatus comprising:
   a wearable dimensioned to be donned by a user of an artificial reality system;
   a signal generator incorporated into the wearable, wherein the signal generator propagates an acoustic wave via a body of the user toward a specific body part;
   an acoustic sensor incorporated into the wearable, wherein the acoustic sensor detects an acoustic reflection of the acoustic wave propagated by the signal generator; and
   at least one processing device communicatively coupled to the acoustic sensor, wherein the processing device:
   processes the acoustic reflection via a machine learning model trained with training data that includes:
   one or more samples representative of the user touching an object with the specific body part; and
   one or more additional samples representative of the user not touching the object with the specific body part;
   determines, based at least in part on the acoustic reflection processed via the machine learning model, that the specific body part has made physical contact with the object;
   in response to determining that the specific body part has made physical contact with the object, generates an input command for the artificial reality system that accounts for the specific body part making physical contact with the object;
   detects, while monitoring the acoustic reflection over a certain period of time, a change in the acoustic reflection;
   determines, based at least in part on the change detected in the acoustic reflection, that the specific body part is no longer in physical contact with the object; and
   generates a subsequent input command for the artificial reality system that accounts for the specific body part no longer being in physical contact with the object.

2. The apparatus of claim 1, wherein:
   the signal generator comprises a directional transducer that emits the acoustic wave in a specific direction; and the signal generator is positioned within the wearable such that the directional transducer propagates the acoustic wave toward the specific body part via the body of the user.

3. The apparatus of claim 2, wherein the directional transducer is calibrated to steer the acoustic wave toward the specific body part via the body of the user.

4. The apparatus of claim 2, wherein the wearable comprises a wristband dimensioned to be donned on a wrist of the user.

5. The apparatus of claim 4, wherein the signal generator is positioned within the wristband to be proximate to a skin surface of the user such that the directional transducer propagates the acoustic wave toward the specific body part via at least one of:
the skin surface of the user; or
one or more bones of the user.

6. The apparatus of claim 4, wherein the acoustic sensor is positioned within the wristband to be proximate to a skin surface of the user to facilitate detection of the acoustic reflection via the body of the user, the acoustic reflection having propagated from the specific body part to the wristband via at least one of:
the skin surface of the user; or
one or more bones of the user.

7. The apparatus of claim 1, wherein the processing device:
detects, while monitoring the acoustic reflection over the certain period of time, an additional change in the acoustic reflection; and
determines that the additional change detected in the acoustic reflection is indicative of physical contact made by the specific body part.

8. The apparatus of claim 7, wherein the processing device:
detects, while monitoring the acoustic reflection, a dampening in the acoustic reflection; and
determines that the dampening detected in the acoustic reflection is indicative of physical contact made by the specific body part.

9. The apparatus of claim 1, wherein the processing device:
detects, while monitoring the acoustic reflection, a rebound in the acoustic reflection; and
determines that the rebound detected in the acoustic reflection is indicative of the specific body part releasing the object.

10. The apparatus of claim 1, wherein the processing device:
compares the acoustic reflection to at least one signature that represents an acoustic profile of the specific body part making physical contact with the object;
determines, based at least in part on the comparison of the acoustic reflection and the signature, that the acoustic reflection matches the signature; and
determines, due at least in part to the acoustic reflection matching the signature, that the specific body part has made physical contact with the object.

11. The apparatus of claim 10, wherein the processing device:
detects, within the acoustic reflection via the machine learning model, a pattern indicative of the specific body part making physical contact with the object; and
determines, based at least in part on the pattern detected within the acoustic reflection via the machine learning model, that the specific body part has made physical contact with the object.

12. The apparatus of claim 1, wherein the processing device facilitates modifying at least one virtual component of the artificial reality system to account for the specific body part making physical contact with the object.

13. A wearable comprising:
a fastener dimensioned to facilitate securing the wearable to a user of an artificial reality system;
a signal generator that propagates an acoustic wave via a body of the user toward a specific body part;
an acoustic sensor that detects an acoustic reflection of the acoustic wave propagated by the signal generator; and
at least one processing device communicatively coupled to the acoustic sensor, wherein the processing device:
processes the acoustic reflection via a machine learning model trained with training data that includes:
one or more samples representative of the user touching an object with the specific body part; and
one or more additional samples representative of the user not touching the object with the specific body part;
determines, based at least in part on the acoustic reflection processed via the machine learning model, that the specific body part has made physical contact with the object;
in response to determining that the specific body part has made physical contact with the object, generates an input command for the artificial reality system that accounts for the specific body part making physical contact with the object;
detects, while monitoring the acoustic reflection over a certain period of time, a change in the acoustic reflection;
determines, based at least in part on the change detected in the acoustic reflection, that the specific body part is no longer in physical contact with the object; and
generates a subsequent input command for the artificial reality system that accounts for the specific body part no longer being in physical contact with the object.

14. The wearable of claim 13, wherein:
the signal generator comprises a directional transducer that emits the acoustic wave in a specific direction; and
the signal generator is positioned within the wearable such that the directional transducer propagates the acoustic wave toward the specific body part via the body of the user.

15. The wearable of claim 14, wherein the directional transducer is calibrated to steer the acoustic wave toward the specific body part via the body of the user.

16. The wearable of claim 14, further comprising a wristband dimensioned to be donned on a wrist of the user, wherein the fastener facilitates securing the wristband to the wrist of the user.

17. The wearable of claim 16, wherein the signal generator is positioned within the wristband to be proximate to a skin surface of the user such that the directional transducer propagates the acoustic wave toward the specific body part via at least one of:
the skin surface of the user; or
one or more bones of the user.

18. The wearable of claim 16, wherein the acoustic sensor is positioned within the wristband to be proximate to a skin surface of the user to facilitate detection of the acoustic reflection via the body of the user, the acoustic reflection having propagated from the specific body part to the wristband via at least one of:
the skin surface of the user; or
one or more bones of the user.

19. A method comprising:
propagating, by a signal generator incorporated into a wearable donned by a user of an artificial reality system, an acoustic wave via a body of the user toward a specific body part;
detecting, by an acoustic sensor incorporated into the wearable, an acoustic reflection of the acoustic wave propagated by the signal generator;
processing the acoustic reflection via a machine learning model trained with training data that includes:
 one or more samples representative of the user touching an object with the specific body part; and
 one or more additional samples representative of the user not touching the object with the specific body part;
determining, based at least in part on the acoustic reflection detected by the acoustic sensor processed via the machine learning model, that the specific body part has made physical contact with the object; and
in response to determining that the specific body part has made physical contact with the object, generating an input command for the artificial reality system that accounts for the specific body part making physical contact with the object
detecting, while monitoring the acoustic reflection over a certain period of time, a change in the acoustic reflection;
determining, based at least in part on the change detected in the acoustic reflection, that the specific body part is no longer in physical contact with the object; and
generating a subsequent input command for the artificial reality system that accounts for the specific body part no longer being in physical contact with the object.

* * * * *